US010764912B2

(12) United States Patent
Vajapeyam et al.

(10) Patent No.: US 10,764,912 B2
(45) Date of Patent: Sep. 1, 2020

(54) SCHEDULING REQUEST MODES FOR ENHANCED COMPONENT CARRIERS

(71) Applicant: QUALCOMM Incorporated, San Diego, CA (US)

(72) Inventors: Madhavan Srinivasan Vajapeyam, San Diego, CA (US); Jelena Damnjanovic, Del Mar, CA (US); Aleksandar Damnjanovic, Del Mar, CA (US); Onkar Jayant Dabeer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 14/847,739

(22) Filed: Sep. 8, 2015

(65) Prior Publication Data

US 2016/0105905 A1    Apr. 14, 2016

Related U.S. Application Data

(60) Provisional application No. 62/063,308, filed on Oct. 13, 2014.

(51) Int. Cl.
*H04W 72/12* (2009.01)
*H04L 1/18* (2006.01)
(Continued)

(52) U.S. Cl.
CPC ...... *H04W 72/1263* (2013.01); *H04B 7/0626* (2013.01); *H04L 1/1812* (2013.01); *H04W 72/0446* (2013.01); *H04W 72/1278* (2013.01)

(58) Field of Classification Search
USPC ........................................................ 370/330
See application file for complete search history.

(56) References Cited

U.S. PATENT DOCUMENTS

2005/0141560 A1* 6/2005 Muthiah ................ H04L 47/10
370/474
2009/0125363 A1* 5/2009 Frederiksen ...... H04W 72/1263
370/345
(Continued)

FOREIGN PATENT DOCUMENTS

| CN | 102598534 A | 7/2012 |
| EP | 2 661 136 A2 | 11/2013 |
| WO | 2013111607 A1 | 8/2013 |

OTHER PUBLICATIONS

International Search Report and Written Opinion—PCT/US2015/049084—ISA/EPO—dated Dec. 14, 20154. (14 total pages).
(Continued)

*Primary Examiner* — Alpus Hsu
*Assistant Examiner* — Hooman Houshmand
(74) *Attorney, Agent, or Firm* — Arent Fox, LLP

(57) ABSTRACT

Various aspects described herein relate to communicating a scheduling request (SR) in a wireless network. A frame structure that allows dynamic switching of transmission time intervals (TTI) between uplink and downlink communications may be used to communicate with a network entity. At least one SR mode can be selected for SR transmission to the network entity in one or more of the TTIs configured for uplink communications based at least in part on the frame structure. The SR can be transmitted to the network entity in at least one uplink TTI of the one or more TTIs configured for uplink communications based at least in part on the at least one SR mode.

30 Claims, 10 Drawing Sheets

(51) Int. Cl.
*H04B 7/06* (2006.01)
*H04W 72/04* (2009.01)

(56) References Cited

U.S. PATENT DOCUMENTS

| | | | |
|---|---|---|---|
| 2009/0201838 A1* | 8/2009 | Zhang | H04B 7/2656 370/280 |
| 2010/0040028 A1* | 2/2010 | Maheshwari | H04W 74/02 370/336 |
| 2010/0115355 A1* | 5/2010 | Hsu | H04W 72/1284 714/726 |
| 2010/0322203 A1* | 12/2010 | Hole | H04W 72/1257 370/336 |
| 2011/0103270 A1 | 5/2011 | Chang et al. | |
| 2011/0149813 A1* | 6/2011 | Parkvall | H04B 7/2656 370/280 |
| 2011/0211503 A1* | 9/2011 | Che | H04L 5/0005 370/280 |
| 2011/0292895 A1* | 12/2011 | Wager | H04L 5/0007 370/329 |
| 2012/0135773 A1* | 5/2012 | Shen | H04L 5/0048 455/513 |
| 2012/0190376 A1* | 7/2012 | Rosa | H04W 72/1284 455/450 |
| 2012/0275381 A1* | 11/2012 | Kim | H04W 74/08 370/328 |
| 2013/0044651 A1* | 2/2013 | Wang | H04W 72/0406 370/280 |
| 2013/0163532 A1* | 6/2013 | Anderson | H04W 72/04 370/329 |
| 2013/0194980 A1 | 8/2013 | Yin et al. | |
| 2013/0250828 A1* | 9/2013 | Chou | H04W 72/0413 370/311 |
| 2013/0308610 A1* | 11/2013 | Bergstrom | H04W 56/00 370/336 |
| 2013/0336300 A1 | 12/2013 | Choi et al. | |
| 2014/0050107 A1 | 2/2014 | Charbit et al. | |
| 2014/0153453 A1* | 6/2014 | Park | H04B 7/2656 370/280 |
| 2014/0269452 A1* | 9/2014 | Papasakellariou | H04B 7/2643 370/280 |
| 2014/0293843 A1* | 10/2014 | Papasakellariou | H04W 72/042 370/280 |
| 2015/0173047 A1* | 6/2015 | Yamada | H04W 72/042 370/329 |
| 2015/0188690 A1* | 7/2015 | Khoryaev | H04W 52/0251 370/280 |
| 2015/0304096 A1* | 10/2015 | Sahlin | H04B 7/2615 370/280 |
| 2016/0066276 A1* | 3/2016 | Su | H04J 3/1694 370/252 |

OTHER PUBLICATIONS

Renesas Mobile Europe Ltd: "Discussion on Enhancements for Dynamic TDD UL-DL Configuration", 3GPP Draft; R1-122363, 3rd Generation Partnership Project (3GPP), Mobile Competence Centre ; 650, Route Des Lucioles ; F-06921 Sophia-Antpolis Cedex; France, vol. RAN WG1, no. Prague, Czech Republic; May 21, 2012-May 25, 2012, May 12, 2012 (May 12, 2012), XP050600626, [retrieved on May 12, 2012] Signalling TDD UL-DL reconfiguration; paragraph [02.1]—paragraph [02.3], Four pages.

3GPP TS 36.211: "3rd Generation Partnership Project; Technical Specification Group Radio Access Network; Evolved Universal Terrestrial Radio Access (E-UTRA); Physical Channels and Modulation (Release 11)," V11.3.0, Jun. 2013, pp. 1-108.

"3rd Generation Partnership Project; Technical Specification Group Radio Access Network; Evolved Universal Terrestrial Radio Access (E-UTRA); Medium Access Control (MAC); Protocol Specification (Release 10)", 3GPP TS36.321: "MAC Layer Procedures", v10.0.0, Dec. 2010, pp. 1-53.

Ericsson, et al., "Latency Improvement Comparison", 3GPP TSG-RAN WG2 #67, 3GPP Draft; R2-094825 (Latency Improvements Comparison), 3rd Generation Partnership Project (3GPP), Mobile Competence Centre; 650, Route Des Lucioles; F-06921 Sophia-Antipolis Cedex; France, no. Shenzhen, China; Aug. 18, 2009, Aug. 18, 2009 (Aug. 18, 2009), pp. 1-4, XP050352833, [retrieved on Aug. 18, 2009].

Mediatek Inc: "Discussion on Differences in Behaviors between Fixed and Flexible Subframes", 3GPP TSG-RAN WG1#73 R1-132274, May 11, 2013, pp. 1-6, URL: https://www.3gpp.org/ftp/tsg_ran/WG1_RL1/TSGR1_73/Docs/R1-132274.zip.

* cited by examiner

SCHEDULING REQUEST MODES FOR ENHANCED COMPONENT CARRIERS

CLAIM OF PRIORITY UNDER 35 U.S.C. § 119

The present application for patent claims priority to Provisional Application No. 62/063,308 entitled "SCHEDULING REQUEST MODES FOR ENHANCED COMPONENT CARRIERS" filed Oct. 13, 2014, which is assigned to the assignee hereof and hereby expressly incorporated by reference herein.

BACKGROUND

Described herein are aspects generally related to communication systems, and more particularly, to transmitting scheduling requests by user equipment in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing LTE, a plurality of user equipment (UE) served by a particular eNodeB may be scheduled resources for communicating with the eNodeB over uplink channels configured on one or more component carriers. In this regard, the UE can communicate a scheduling request (SR) to the eNodeB, which can typically occur on preconfigured resources. As lower latency communication technologies are implemented, the periodicity of the preconfigured SR resources in LTE may not be frequent enough to allow the UE to request resources to provide communication rates supported by the technologies.

As lower latency communication technologies are developed, a different design for communicating SR may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating a scheduling request (SR) in a wireless network is provided. The method includes communicating with a network entity using a frame structure that allows dynamic switching of transmission time intervals (TTI) between uplink and downlink communications, selecting at least one SR mode for SR transmission to the network entity in one or more of the TTIs configured for uplink communications based at least in part on the frame structure, and transmitting SR to the network entity in at least one uplink TTI of the one or more TTIs configured for uplink communications based at least in part on the at least one SR mode.

In other aspects, a user equipment for communicating a SR in a wireless network is provided. The user equipment includes a transceiver, at least one processor communicatively coupled with the transceiver via a bus for communicating signals in the wireless network, and a memory communicatively coupled with the at least one processor and/or the transceiver via the bus. The at least one processor and the memory are operable to communicate, via the transceiver, with a network entity using a frame structure that allows dynamic switching of TTIs between uplink and downlink communications, select at least one SR mode for SR transmission to the network entity in one or more of the TTIs configured for uplink communications based at least in part on the frame structure, and transmit, via the transceiver, SR to the network entity in at least one uplink TTI of the one or more TTIs configured for uplink communications based at least in part on the at least one SR mode.

In another example, a user equipment for communicating a SR in a wireless network is provided. The user equipment includes means for communicating with a network entity using a frame structure that allows dynamic switching of TTIs between uplink and downlink communications, means for selecting at least one SR mode for SR transmission to the network entity in one or more of the TTIs configured for uplink communications based at least in part on the frame structure, and means for transmitting SR to the network entity in at least one uplink TTI of the one or more TTIs configured for uplink communications based at least in part on the at least one SR mode.

In other aspects, a computer-readable storage medium comprising computer-executable code for communicating a SR in a wireless network is provided. The code includes code for communicating with a network entity using a frame structure that allows dynamic switching of TTIs between uplink and downlink communications, code for selecting at least one SR mode for SR transmission to the network entity in one or more of the TTIs configured for uplink communications based at least in part on the frame structure, and code for transmitting SR to the network entity in at least one uplink TTI of the one or more TTIs configured for uplink communications based at least in part on the at least one SR mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
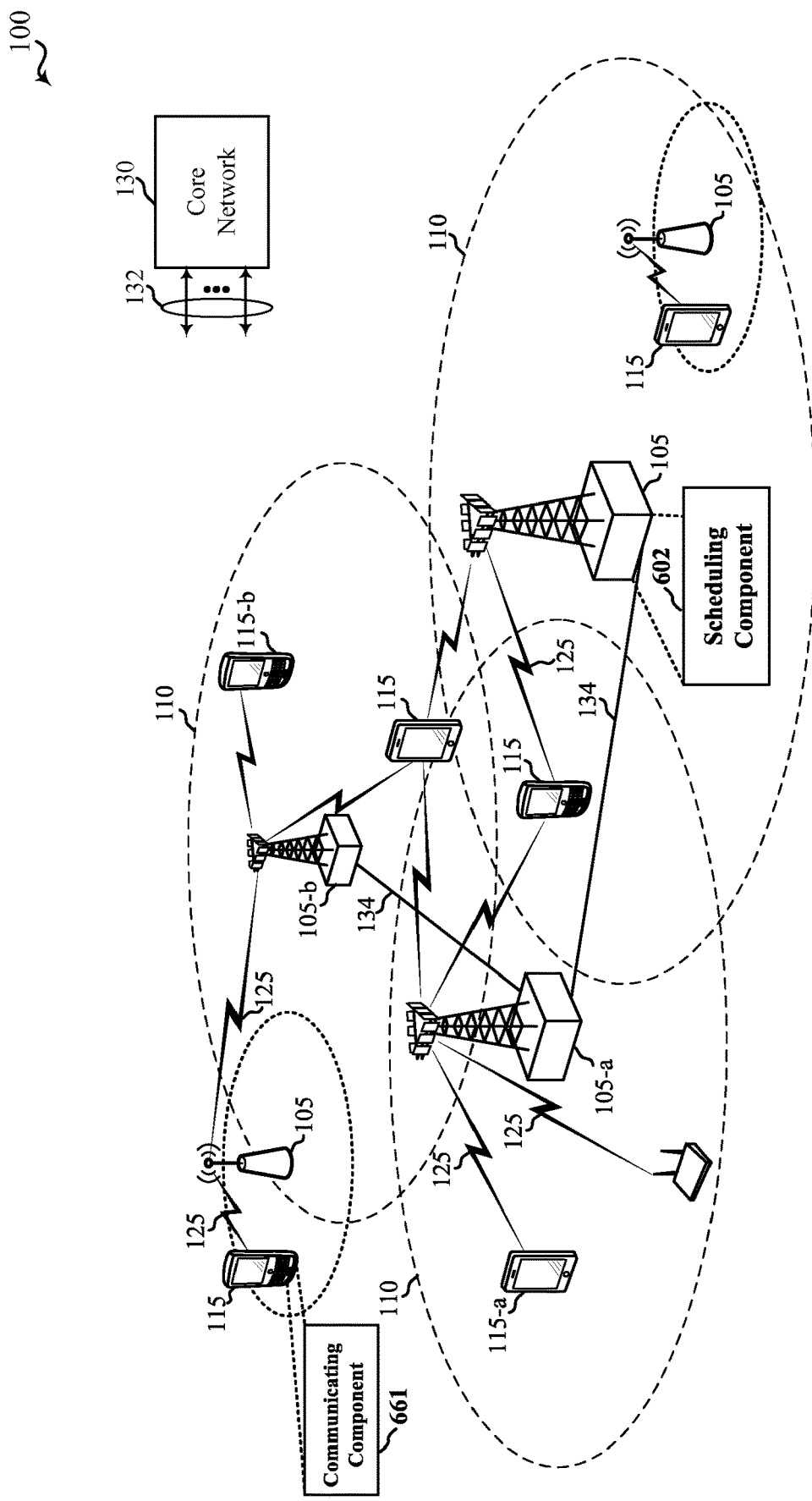
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating scheduling requests (SR) in lower latency communication configurations. For example, lower latency communication configurations may include substantially any configuration having a lower latency than a present wireless communication technology (e.g., ultra low latency (ULL) LTE having a 1 subframe TTI as opposed to the 1 ms TTI of LTE). In particular, wireless network communications may support a time division duplexing (TDD) frame structure that facilitates dynamic switching between uplink and downlink transmission time intervals (TTI) to provide opportunities for scheduling uplink and/or downlink resources as needed to achieve the lower latency. One or more SR modes can be supported for transmitting SR according to the TDD frame structure, including a periodic SR mode configuring SR resources on TTIs that are scheduled for uplink communications in the frame structure, an aperiodic SR mode configuring SR resources to possibly be multiplexed with other scheduled uplink transmissions, and/or an opportunistic mode periodically configuring SR resources over the TTIs such that SRs that happen to be configured on downlink TTIs can be masked. Accordingly, using one or more of the SR modes can allow for more frequent SR opportunities to be configured for a user equipment (UE), which can facilitate transmitting SR in lower latency communications. Though shown and described with respect to the lower latency communication configurations, it is to be appreciated that the functions described herein can also be applied to a present wireless communication technology, such as LTE.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 602 configured to communicate resource grants (e.g., for control and/or data uplink communications) to UEs 115 based on a frame structure, for example but not limited to frame structure 700, 750 (FIG. 7), configured for lower latency communications. Similarly, one or more of UEs 115 may include a communicating component 661 configured to receive, decode, transmit, and operate using the frame structure (e.g., based on resource grants received from an access point 105).

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each communication link 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel. In one example, the PCell and/or SCell can configure one or more enhanced component carriers (eCC) that provide lower latency communications (e.g., using frame structure 700, 750 in FIG. 7 or a similar frame structure with lower latency TTIs), as described further herein.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing acknowledgement (ACK)/non-acknowledgement (NACK) for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
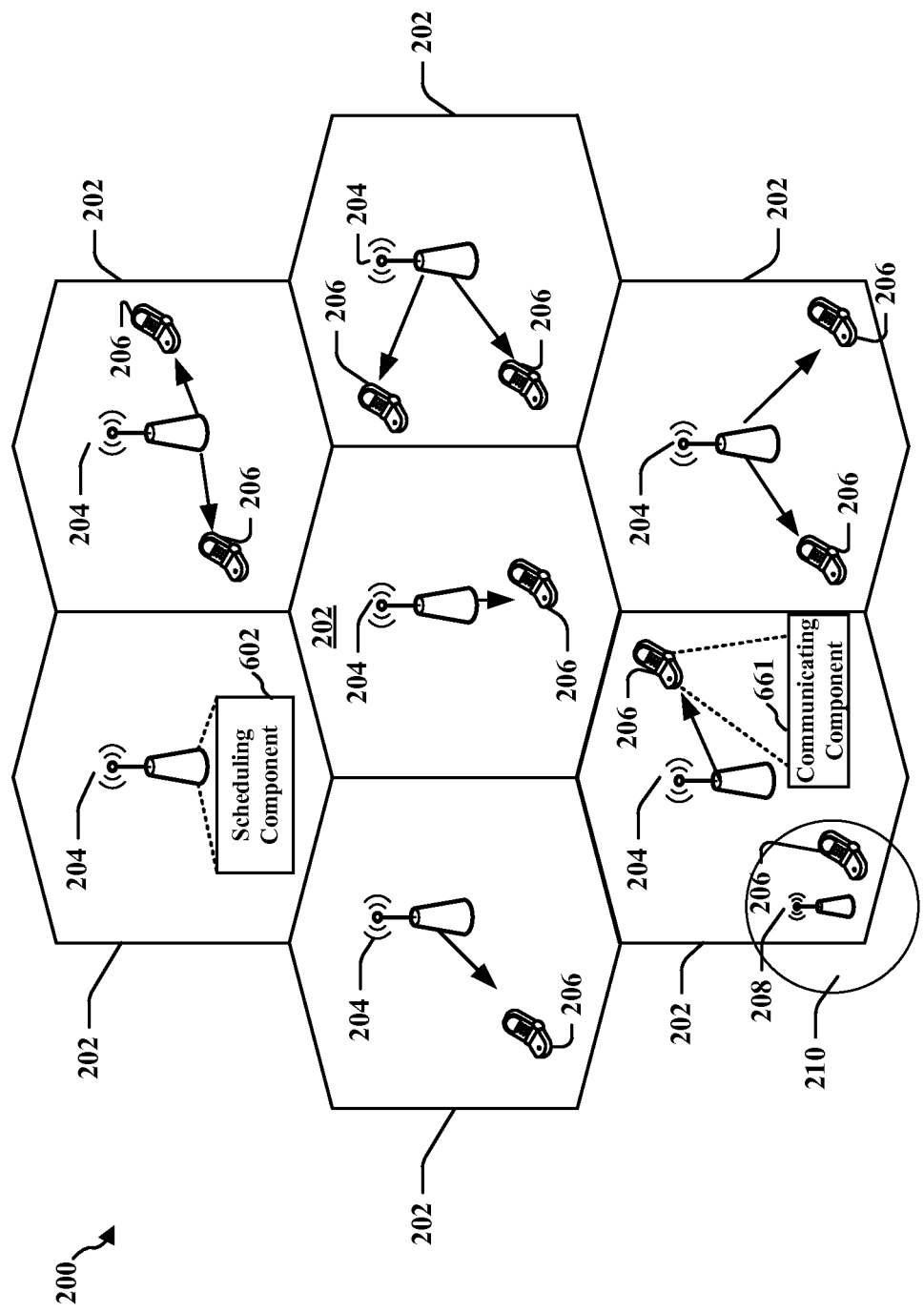
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include a scheduling component 602 configured to communicate resource grants to UEs 206 based on a frame structure, for example but not limited to frame structure 700, 750 (FIG. 7), configured for lower latency communications. Similarly, one or more of UEs 206 may include a communicating component 661 configured to receive, decode, transmit, and operate using the frame structure (e.g., based on resource grants received from an access point 105). There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway (not shown).

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
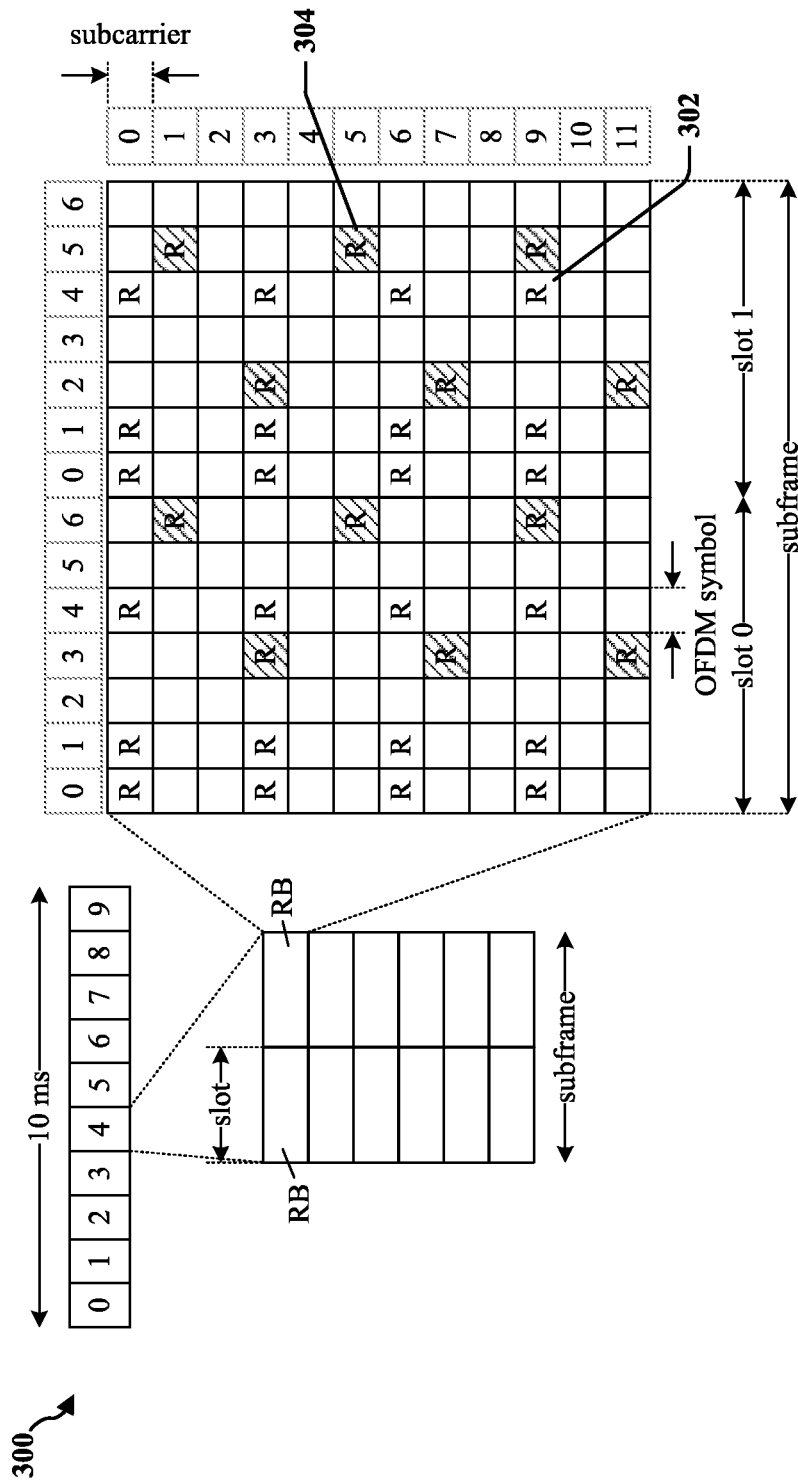
FIG. 3 is a diagram illustrating an example of a downlink (DL) frame structure in long term evolution (LTE).

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE. In an example, in lower latency communication configurations (e.g., ULL LTE), such as in the frame structure 700, 750 in FIG. 7, each OFDM symbol can be a TTI and/or may include different configuration of frequency and time resources within the OFDM symbol. It is to be appreciated that the TTI of the lower latency communication configurations can be more than one OFDM symbol, a slot, etc., which is less than a subframe in duration.

Figure 4:
FIG. 4 is a diagram illustrating an example of an uplink (UL) frame structure in LTE.

FIG. 4 is a diagram 400 illustrating an example of an UL frame structure in LTE, which, in some examples, may be utilized in conjunction with the ULL LTE UL frame structure described herein. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms). In an example, in lower latency communication configurations (e.g., ULL LTE), such as in the frame structure 700, 750 in FIG. 7, each slot can include one or more symbols, and each symbol can be a TTI and/or may include different configuration of frequency and time resources within the symbol. It is to be appreciated that the TTI of the lower latency communication configurations can be more than one symbol, a slot, etc., which is less than a subframe in duration.

Figure 5:
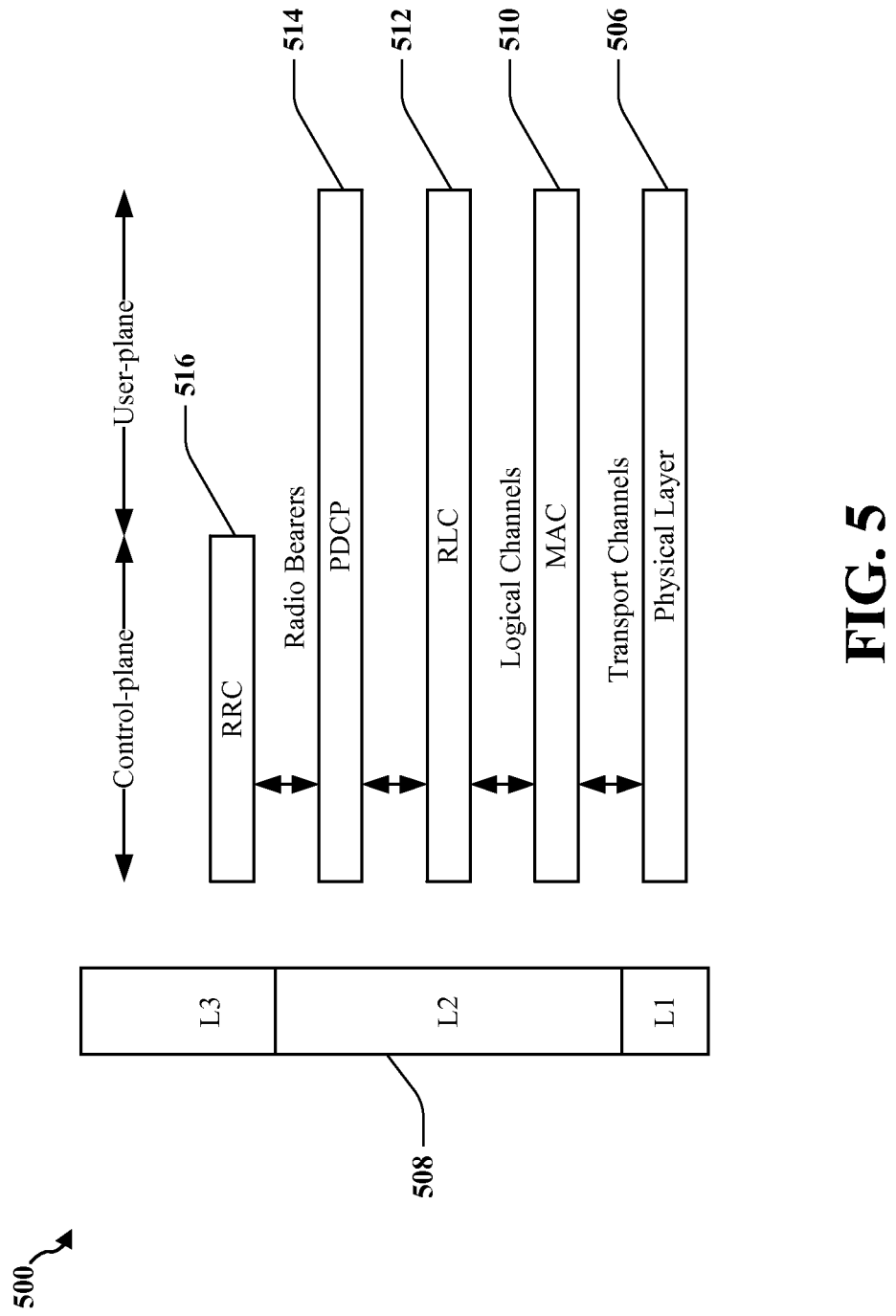
FIG. 5 is a diagram illustrating an example of a radio protocol architecture for the user and control planes.

FIG. 5 is a diagram 500 illustrating an example of a radio protocol architecture for the user and control planes in LTE and ULL LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506. For example, SR communications, as described herein, may occur at L1 506 between a UE 115 and access point 105.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
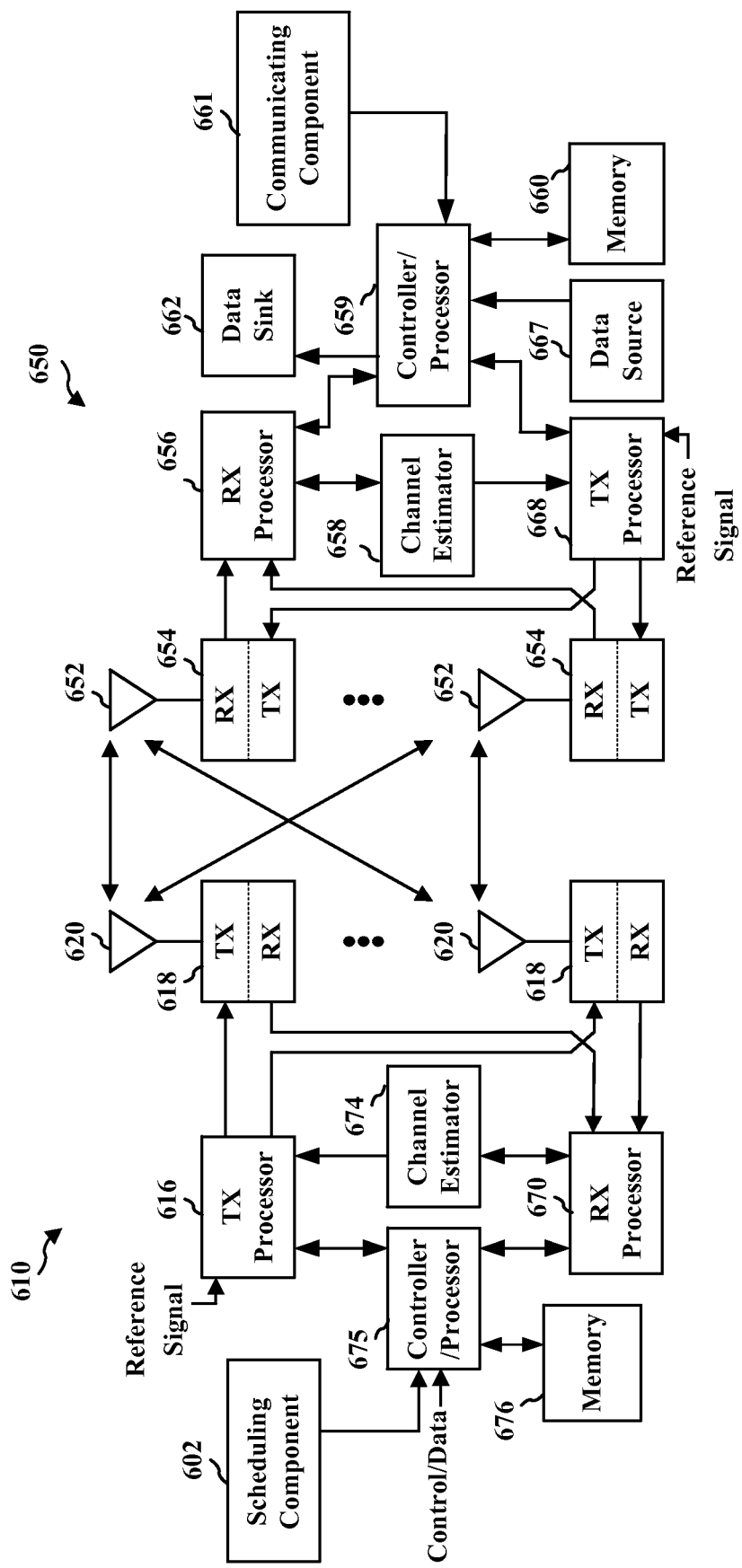
FIG. 6 is a diagram illustrating an example of an evolved Node B and user equipment in an access network.

FIG. 6 is a block diagram of an eNB 610 (e.g., access point 105, eNB 804, etc.) in communication with a UE 650 (e.g., UE 115, 802, etc.) in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

Figure 7:
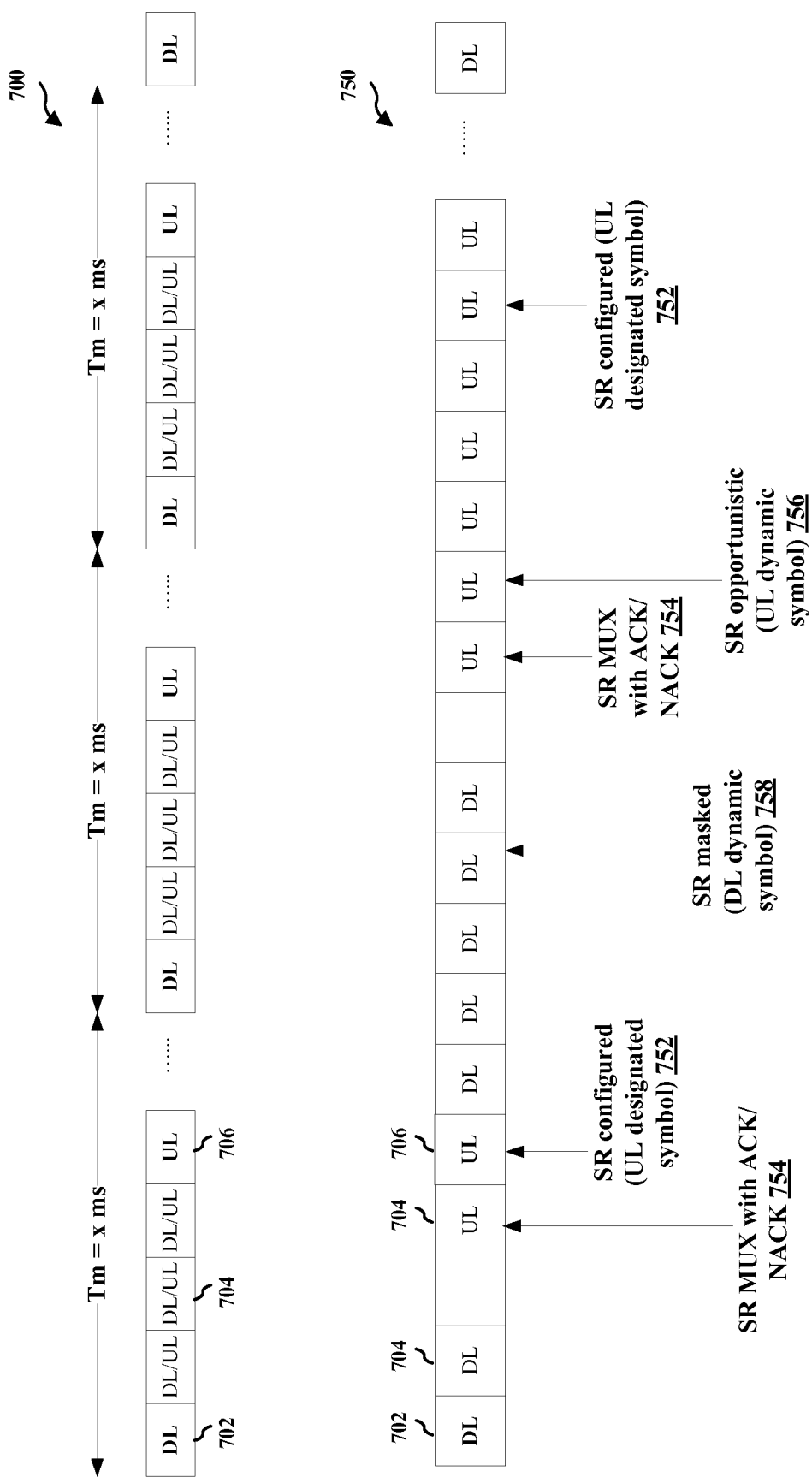
FIG. 7 is a diagram illustrating example frame structures for allowing dynamic switching of transmission time intervals (TTI) to be configured for uplink or downlink communications.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a scheduling component 602 configured to communicate resource grants to UE 650 using a frame structure for lower latency communications over at least one CC, for example but not limited to frame structure 700, 750 (FIG. 7).

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a communicating component 661 configured to receive, decode, transmit, and operate using the frame structure for lower latency (e.g., based on resources granted according to the frame structure by scheduling component 602 and received from eNB 610), as described herein.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7 is a diagram illustrating non-limiting examples of a frame structure 700 and frame structure 750 with resource allocations for various SR modes described herein. Frame structure 700 depicts a TDD frame structure having multiple frames of time (Tm) equal to x milliseconds (ms), where x is a positive integer. Each frame can include one or more TTIs configured as a dedicated downlink TTI 702, a configurable downlink or uplink TTI 704, or a dedicated uplink TTI 706. In an example, each TTI can be a symbol, multiple symbols, a slot, etc. in a lower latency communication configuration described above, a subframe in LTE, etc. For example, designating dedicated downlink TTIs 702 and uplink TTIs 706 can enable radio resource management (RRM) measurements, synchronization between UEs and eNBs, channel state information (CSI) feedback transmissions, random access channel (RACH) communications, SRs, etc. In an example, the dedicated downlink TTIs 702 and dedicated uplink TTIs 706 can be radio resource control (RRC) configured between network nodes (e.g., between a UE and eNB).

Moreover, for example, the remaining TTIs 704, which are configurable for uplink or downlink communications, can be dynamically switched between uplink and downlink communications. In one example, a serving network node, such as an eNB, can determine the switching and define the switching in one or more resource grants provided to other network nodes, such as a UE, for communicating with the serving network node. In this regard, a network node receiving the grant can determine whether a given TTI is configured for receiving communications from the serving network node (downlink communications) or transmitting communications to the serving network node (uplink communications). It is to be appreciated that each TTI in the frame structure 700 can be defined by an OFDM symbol and may thus be of a duration that is shorter than that the 1 millisecond (ms) subframe duration of TTIs in LTE, such to provide lower latency communications. The dynamic switching between uplink and downlink TTIs may provide for an adaptable frame to handle a desired distribution of uplink and downlink communications, which can allow for achieving certain uplink/downlink latencies.

Periodic scheduling of SR performed in current LTE systems may not be sufficient for scheduling resources in lower latency communications, which may benefit from more frequent transmission of SRs and receipt of corresponding resource grants. In this regard, SR is an important component of uplink latency as it directly impacts how early an uplink grant is received at a UE when data arrives in the UE buffer. Accordingly, different SR modes are described herein for use with the lower latency TDD frame structure 700, or similar frame structures. It is to be appreciated that a UE may use one or more of the SR modes for transmitting SRs to the eNB, and the mode and/or related resources may be configured by the eNB, or another network node, for the UE.

The different SR modes are depicted in frame structure 750. Frame structure 750 similarly includes various TTIs including TTIs 702 dedicated for DL communications, TTIs 704 that can be dynamically configured for DL or UL communications, and TTIs 706 dedicated for UL communications. For example, the SR modes may include a periodic SR mode where SR resources are configured on periodic dedicated uplink TTIs 706, such as TTI 752. For example, in the periodic SR mode, SR can be configured on each dedicated uplink TTI 706 (including TTI 752), dedicated uplink TTIs 706 with a configured interval (e.g., every nth dedicated uplink TTI 752, where n is a positive integer), randomly selected dedicated uplink TTIs 706, which may be configured by the network, pseudo-randomly selected dedicated uplink TTIs 706 (e.g., selected based on another parameter, such as a cell identifier of the network node), etc.

In another example, the SR modes may include an aperiodic SR mode where the SR resources are configured as needed or otherwise not based on a periodic pattern, and thus may be multiplexed with other uplink transmissions. For example, in the aperiodic SR mode, SR resources can be configured to be multiplexed with acknowledgement (ACK)/negative-acknowledgement (NACK) transmitted in a dynamic uplink TTI 754. In other examples, SR resources in this mode can be configured to be multiplexed with CSI or other uplink control information. For example, in the aperiodic SR mode, SR can be configured to be transmitted with each instance of uplink control information or a certain type of uplink control information (e.g., ACK/NACK, CSI, etc.), transmitted with uplink transmissions in certain TTIs as configured by the eNB, etc.

In yet another example, the SR modes may include an opportunistic mode where SR resources are configured on dynamic uplink TTIs 704, including TTIs 756. In this example, the SR resources can be periodically configured (e.g., by an eNB, randomly, pseudo-randomly, etc.), but if a given TTI 704 is configured as a downlink TTI 758, the TTI can be masked and not used for SR transmission. Masking the SR transmission may include refraining from transmitting the SR, transmitting the SR with a low or NULL transmit power, reserving the SR transmission for transmitting in a subsequent TTI 704 that is configured for opportunistic SR transmission and is an uplink TTI, etc. Thus, in this example, the periodicity or other scheduling of SR transmissions can be configured by the eNB, and where the UE determines an SR transmission opportunity is in a downlink configured TTI, the UE can refrain from transmitting the SR.

Figure 8:
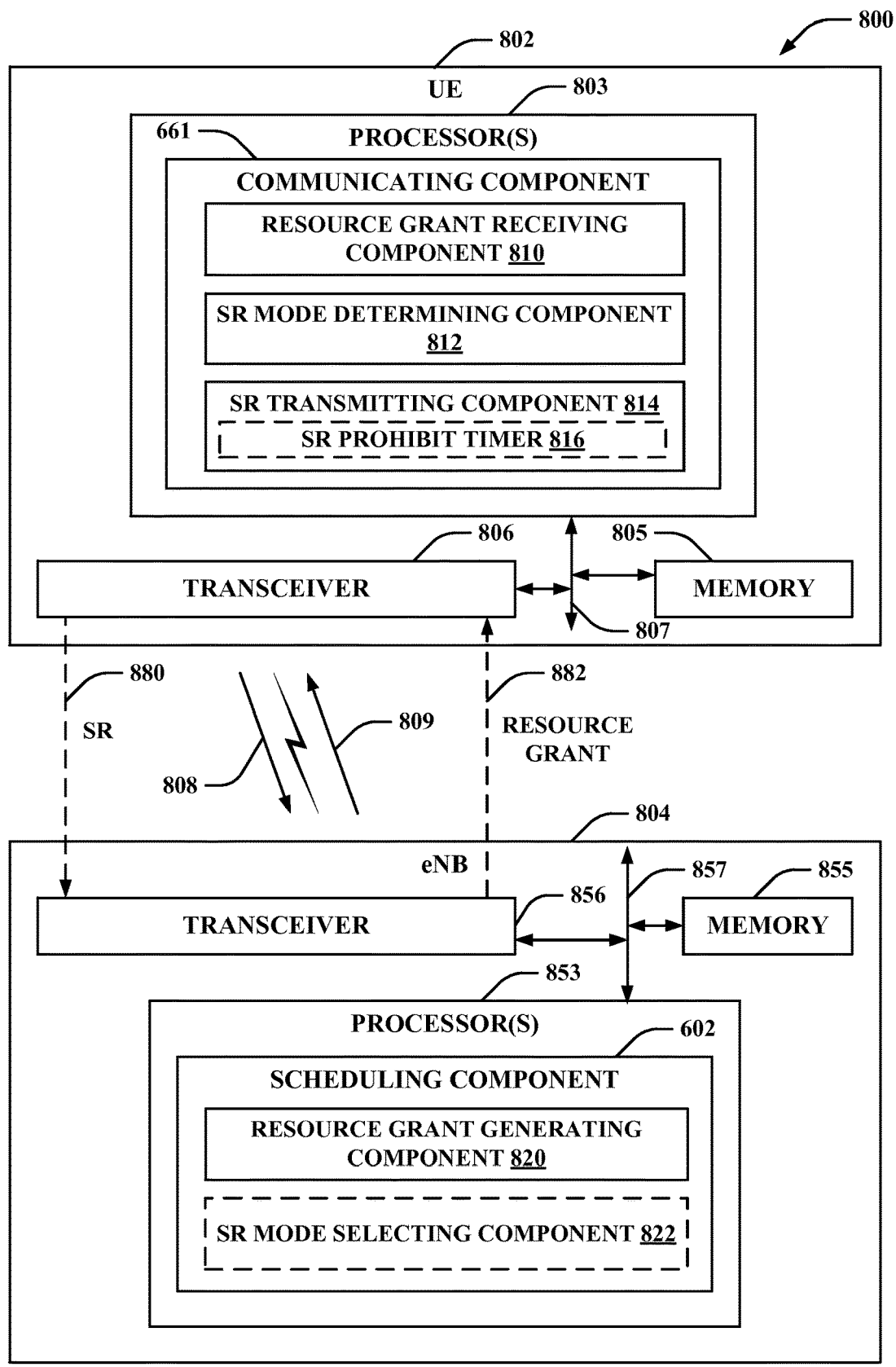
FIG. 8 is a diagram illustrating an example system for communicating scheduling requests (SR) related to frame structures that allow dynamic switching of TTIs between uplink and downlink communications in accordance with aspects described herein.
Figure 9:
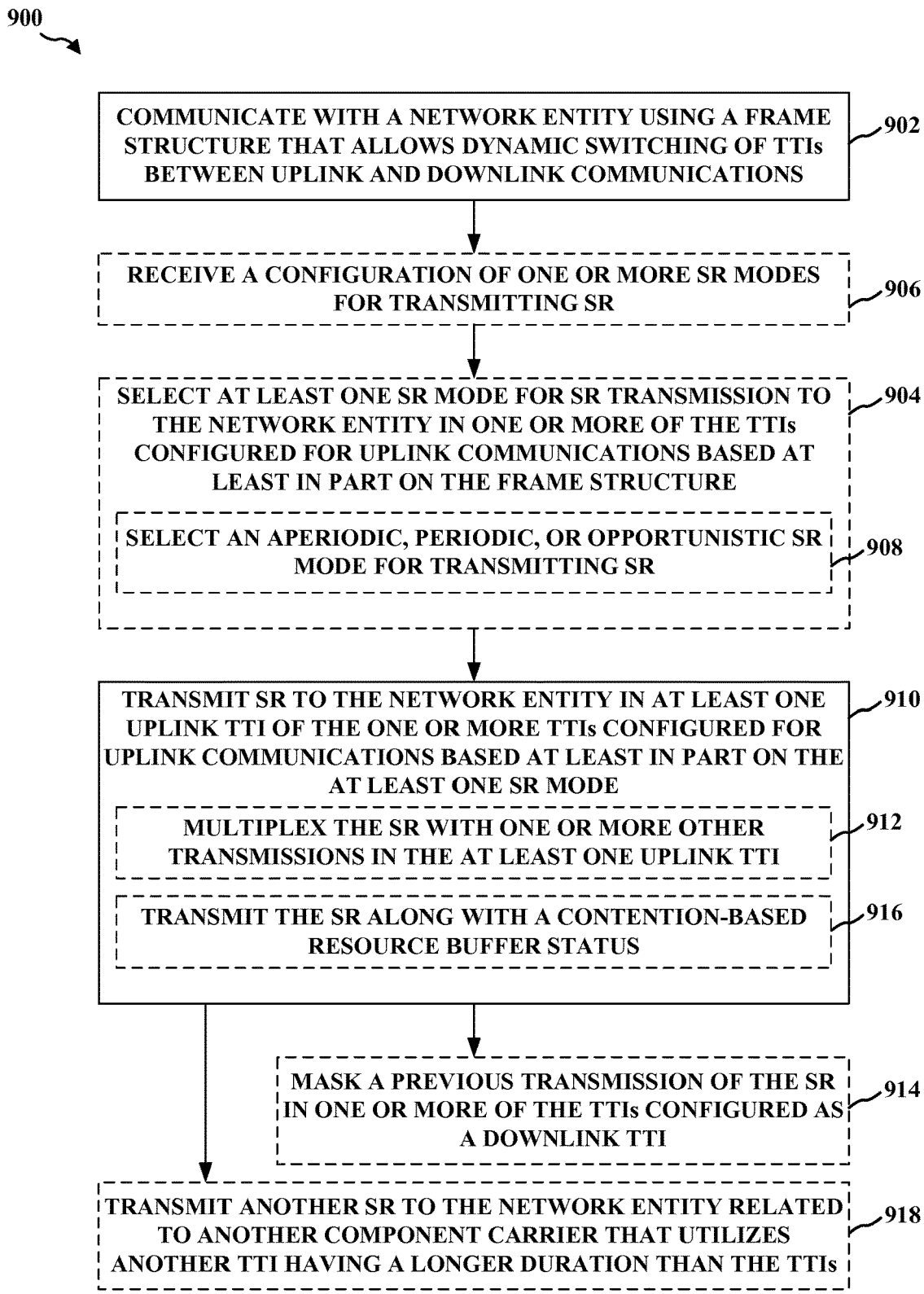
FIG. 9 is a flow chart of an example method of transmitting SRs related to frame structures that allow dynamic switching of TTIs between uplink and downlink communications.
Figure 10:
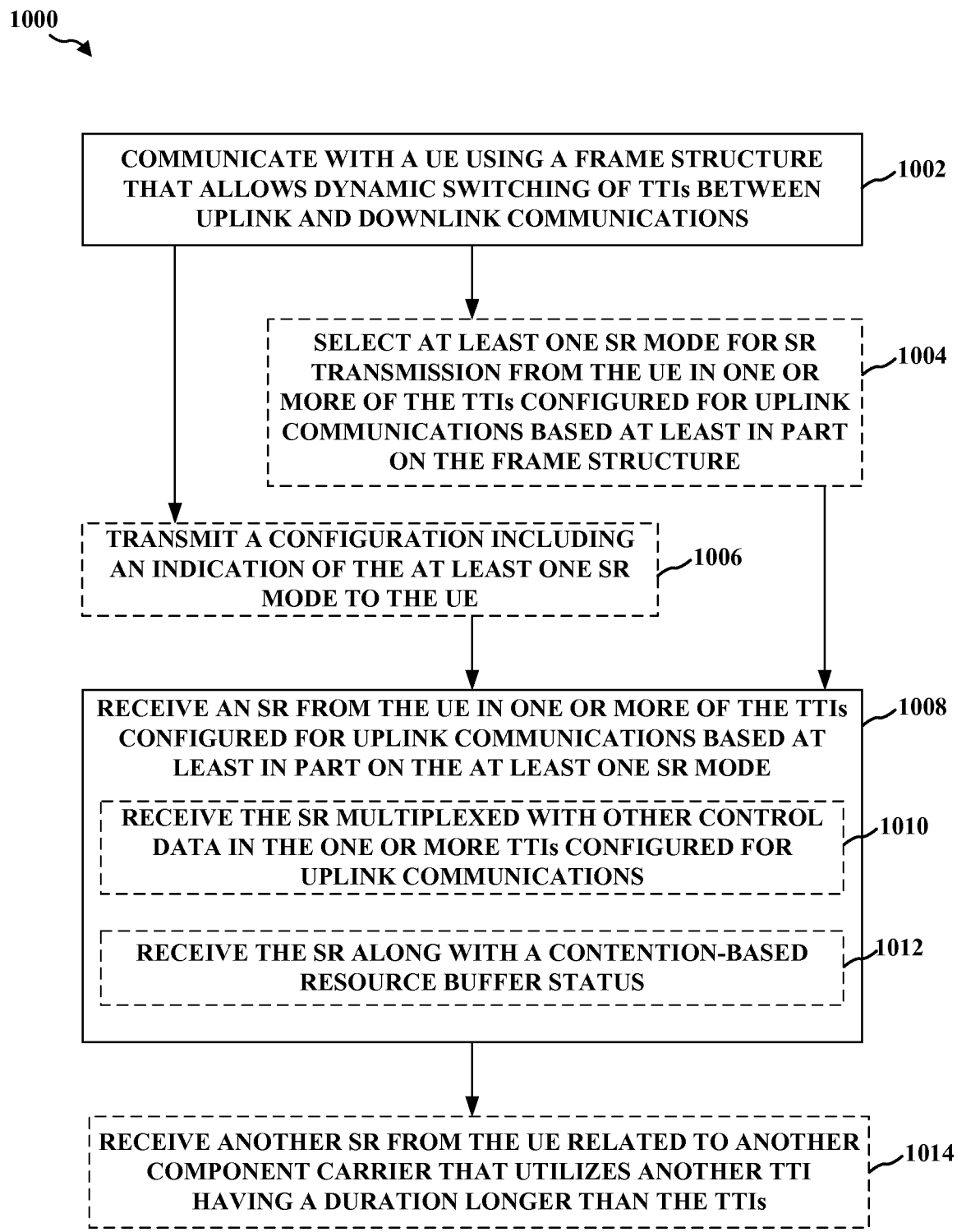
FIG. 10 is a flow chart of an example method of receiving SRs related to frame structures that allow dynamic switching of TTIs between uplink and downlink communications.

Referring to FIGS. 8-10, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 9 and 10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 8 illustrates an example system 800 for communicating SRs in a wireless network. System 800 includes a UE 802 that communicates with an eNB 804 to access a wireless network, examples of which are described in FIGS. 1, 2, 6, etc., above. In an aspect, eNB 804 and UE 802 may have established one or more downlink channels over which to communicate via downlink signals 809, which can be transmitted by eNB 804 (e.g., via transceiver 856) and received by UE 802 (e.g., via transceiver 806) for communicating control and/or data messages (e.g., signaling) from the eNB 804 to the UE 802 over configured communication resources. Moreover, for example, eNB 804 and UE 802 may have established one or more uplink channels over which to communicate via uplink signals 808, which can be transmitted by UE 802 (e.g., via transceiver 806) and received by eNB 804 (e.g., via transceiver 856) for communicating control and/or data messages (e.g., signaling) from the UE 802 to the eNB 804 over configured communication resources. For example, UE 802 may communicate a SR 880 to eNB 804 over one or more uplink control channels (resources for which may be granted by eNB 804), which may be according to one or more of the SR modes described with respect to FIG. 7 (e.g., periodic, aperiodic, and/or opportunistic). Moreover, for example, eNB 804 may communicate one or more resource grants 882 to UE 802 in response to the SR for scheduling resources for the UE 802 to communicate with eNB 804.

In an aspect, UE 802 may include one or more processors 803 and/or a memory 805 that may be communicatively coupled, e.g., via one or more buses 807, and may operate in conjunction with or otherwise implement a communicating component 661 for transmitting a SR 880 to the eNB 804, receiving a resource grant 882 from the eNB 804, etc., as described herein, which may also include receiving a resource grant 882 over which to transmit SR to eNB 804 (e.g., in an uplink control channel). For example, the various operations related to communicating component 661 may be implemented or otherwise executed by one or more processors 803 and, in an aspect, can be executed by a single processor, while in other aspects, different ones of the operations may be executed by a combination of two or more different processors. For example, in an aspect, the one or more processors 803 may include any one or any combination of a modem processor, or a baseband processor, or a digital signal processor, or an application specific integrated circuit (ASIC), or a transmit processor, receive processor, or a transceiver processor associated with transceiver 806. Further, for example, the memory 805 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 803. Moreover, memory 805 or computer-readable storage medium may be resident in the one or more processors 803, external to the one or more processors 803, distributed across multiple entities including the one or more processors 803, etc.

In particular, the one or more processors 803 and/or memory 805 may execute actions or operations defined by communicating component 661 or its subcomponents. For instance, the one or more processors 803 and/or memory 805 may execute actions or operations defined by a resource grant receiving component 810 for obtaining resource grants from eNB 804, which may include resources for transmitting an SR, resources for communicating with eNB 804 based on the SR, etc. In an aspect, for example, resource grant receiving component 810 may include hardware (e.g., one or more processor modules of the one or more processors 803) and/or computer-readable code or instructions stored in memory 805 and executable by at least one of the one or more processors 803 to perform the specially configured resource grant receiving and/or processing operations described herein. Further, for instance, the one or more processors 803 and/or memory 805 may execute actions or operations defined by a SR mode determining component 812 for determining one or more SR modes or related resources for transmitting SR. In an aspect, for example, SR mode determining component 812 may include hardware (e.g., one or more processor modules of the one or more processors 803) and/or computer-readable code or instructions stored in memory 805 and executable by at least one of the one or more processors 803 to perform the specially configured SR mode determining operations described herein. Further, for instance, the one or more processors 803 and/or memory 805 may optionally execute actions or operations defined by a SR transmitting component 814 for transmitting SRs over resources granted for transmitting SRs and/or according to one or more determined SR modes. In an aspect, for example, SR transmitting component 814 may include hardware (e.g., one or more processor modules of the one or more processors 803) and/or computer-readable code or instructions stored in memory 805 and executable by at least one of the one or more processors 803 to perform the specially configured SR transmitting operations described herein.

Similarly, in an aspect, eNB 804 may include one or more processors 853 and/or a memory 855 that may be communicatively coupled, e.g., via one or more buses 857, and may operate in conjunction with or otherwise implement a one or more of a scheduling component 602 for communicating one or more resource grants 882 for and/or based on SR transmission with a UE 802, as described herein. For example, the various functions related to scheduling component 602 may be implemented or otherwise executed by one or more processors 853 and, in an aspect, can be executed by a single processor, while in other aspects, different ones of the functions may be executed by a combination of two or more different processors, as described above. It is to be appreciated, in one example, that the one or more processors 853 and/or memory 855 may be configured as described in examples above with respect to the one or more processors 803 and/or memory 805 of UE 802.

In an example, the one or more processors 853 and/or memory 855 may execute actions or operations defined by scheduling component 602 or its subcomponents. For instance, the one or more processors 853 and/or memory 855 may execute actions or operations defined by a resource grant generating component 820 for generating one or more resource grants 882 for communicating an SR and/or for communicating data based on a received SR. In an aspect, for example, resource grant generating component 820 may include hardware (e.g., one or more processor modules of the one or more processors 853) and/or computer-readable code or instructions stored in memory 855 and executable by at least one of the one or more processors 853 to perform the specially configured resource grant generating operations described herein. Further, for instance, the one or more processors 853 and/or memory 855 may execute actions or operations defined by an optional SR mode selecting component 822 for selecting and/or configuring one or more SR modes for the UE 802 to utilize in transmitting SR 880 to the eNB 804. In an aspect, for example, SR mode selecting component 822 may include hardware (e.g., one or more processor modules of the one or more processors 853) and/or computer-readable code or instructions stored in memory 855 and executable by at least one of the one or more processors 853 to perform the specially configured SR mode selection operations described herein.

It is to be appreciated that transceivers 806, 856 may be configured to transmit and receive wireless signals through one or more antennas, an RF front end, one or more transmitters, and one or more receivers. In an aspect, transceivers 806, 856 may be tuned to operate at specified frequencies such that UE 802 and/or eNB 804 can communicate at a certain frequency. In an aspect, the one or more processors 803 may configure transceiver 806 and/or one or more processors 853 may configure transceiver 856 to operate at a specified frequency and power level based on a configuration, a communication protocol, etc. to communicate uplink signals 808 and/or downlink signals 809, respectively, over related uplink or downlink communication channels.

In an aspect, transceivers 806, 856 can operate in multiple bands (e.g., using a multiband-multimode modem, not shown) such to process digital data sent and received using transceivers 806, 856. In an aspect, transceivers 806, 856 can be multiband and be configured to support multiple frequency bands for a specific communications protocol. In an aspect, transceivers 806, 856 can be configured to support multiple operating networks and communications protocols. Thus, for example, transceivers 806, 856 may enable transmission and/or reception of signals based on a specified modem configuration.

FIG. 9 illustrates an example method 900 for transmitting SRs (e.g., by a UE to an eNB) according to one or more SR modes. Method 900 includes, at Block 902, communicating with a network entity using a frame structure that allows dynamic switching of TTIs between uplink and downlink communications. Communicating component 661 of UE 802 (FIG. 8) can communicate with the network entity (e.g., eNB 804) using the frame structure that allows dynamic switching of TTIs between uplink and downlink communications. In one example, UE 802 and eNB 804 can be operable in a TDD communications mode where certain TTIs can be dedicated for uplink communications, certain TTIs can be dedicated for downlink communications, and certain TTIs can be configured for uplink or downlink communications (e.g., an example of which is described in FIG. 7). TTIs configured or dedicated for uplink communications can be referred to generally herein as uplink TTIs, and similarly TTIs configured or dedicated for downlink communications can be referred to generally herein as downlink TTIs.

In one example, the TTIs that can be configured for uplink or downlink communications can be dynamically configured as uplink or downlink TTIs by eNB 804 to achieve a desired split between uplink/downlink communications (e.g., based on traffic parameters to allow for achieving a desired uplink and/or downlink data rate). For example, information regarding the configuration of the TTIs or at least an indication of switching between uplink/downlink in a given TTI (e.g., an indication corresponding to a current or next TTI or an indicated number of TTIs from a current or next TTI, etc.) can be communicated to UE 802 (e.g., in one or more downlink signals 809) so the UE 802 and eNB 804 can communicate based on the same configuration. Thus, in one example, scheduling component 602 can determine a TTI configuration and/or when to switch from uplink to downlink communications and/or vice versa in a TTI that supports uplink or downlink communications, and can communicate the TTI configuration and/or indicating of switching to UE 802. In one example, a TTI configuration can include a bit map that indicates via one or more bit values whether each TTI corresponding to a bit is downlink (e.g., bit value 0 or 1) or uplink (e.g., bit value 1 or 0). Moreover, it is to be appreciated that the TTI can be of a duration less than the 1 ms subframe duration in LTE (e.g., 1 OFDM/SC-FDM symbol, two OFDM/SC-FDM symbols, 1 slot, etc.).

Additionally, for example, UE 802 can communicate with the eNB 804 over resources granted to the UE 802 for communicating with the eNB 804. For example, resource grant generating component 820 can configure UE 802 with uplink and/or downlink resources designated based on the frame structure, and resource grant receiving component 810 can receive the resources for communicating with eNB 804 via communicating component 661. In an example, the frame structure can be similar to frame structure 700, 750 (FIG. 7) including dedicated downlink TTIs that are configured for downlink communications, TTIs configurable for either uplink or downlink communications, and dedicated uplink TTIs configured for uplink communications. Thus, communicating component 661 may receive communications in downlink signals 809 from the eNB 804 (e.g., from transceiver 856 for receiving via transceiver 806) over resources configured in one or more of the downlink TTIs, transmit communications to the eNB 804 (which may include SR) in uplink signals 808 over resources configured in one or more of the uplink TTIs (e.g., from transceiver 806 for receiving via transceiver 856), etc. based on the resources configured by eNB 804 for UE 802.

Method 900 can further optionally include, at Block 904, selecting at least one SR mode for SR transmission to the network entity in one or more of the TTIs configured for uplink communications based at least in part on the frame structure. SR mode determining component 812 can select the at least one SR mode for SR transmission to the network entity (e.g., eNB 804) in one or more of the TTIs configured for uplink communications based at least in part on the frame structure. For example, SR mode determining component 812 can select one or more of the periodic SR mode, the aperiodic SR mode, the opportunistic SR mode, etc., as described above. SR mode determining component 812, in one example, can select the SR mode based at least in part on throughput requirements of the UE 802, and may select one or multiple SR modes (e.g., for potentially additional SR transmitting opportunities). For example, SR mode determining component 812 may select the one or more SR modes based at least in part on UE 802 capabilities or requirements for resources (e.g., a buffer level), and/or the like Method 900 may optionally include, at Block 906, receiving a configuration of one or more SR modes for transmitting SR. SR mode selecting component 822 may configure one or more of the SR modes, and may indicate the one or more SR modes in one or more downlink signals 809 to UE 802, which can be received by SR mode determining component 812 via transceiver 806 and utilized in transmitting SR, as described further herein. In another example, SR mode determining component 812 may indicate a selection of one or more of the SR modes to the eNB 804 in one or more uplink signals 808, and SR mode selecting component 822 may determine whether or not to allow the UE 802 to utilize the one or more SR modes (e.g., based on eNB 804 capabilities, load, or other parameters), and may communicate an indication of allowing the one or more SR modes, not allowing the one or more SR modes, one or more of the SR modes that are allowed, etc. Thus, for example, SR mode determining component 812 may receive the indication and determine one or more SR modes for transmitting SR, as described further herein. It is to be appreciated, however, that the SR mode determining component 812 may additionally or alternatively determine one or more SR modes for transmitting SR based on one or more parameters of the UE 802 (e.g., a latency, guaranteed bit rate, quality-of-service, etc. associated with an uplink communication channel, and/or the like).

Thus, in some examples, SR mode selecting component 822 may select the SR mode for the UE 802 and may signal an indication of the selected SR mode and/or one or more related parameters to the UE 802, as described with reference to FIG. 10 below. In this example, SR mode determining component 812 may determine the SR mode based on the indicator received from eNB 804. In yet another example, resource grant generating component 820 may schedule and indicate SR resources for the UE 802 based on a SR mode selected by SR mode selecting component 822. In any case, for example, resource grant generating component 820 generates resource grants for the UE 802 to transmit SR, which may be indicated as resources for SR transmission, more generically as resources for uplink control information transmission, etc. Selecting the at least one SR mode at Block 904 may optionally include, at Block 908, selecting an aperiodic, periodic, or opportunistic SR mode for transmitting SR, as described. SR mode determining component 812 can select the aperiodic, periodic, or opportunistic SR mode for transmitting SR, whether based on parameters specific to UE 802 (e.g., whether data is available to transmit to eNB 804), based on an indication of available the SR mode(s) from eNB 804, and/or the like. In one example, selecting the at least one SR mode can by optional as it may include transmitting the SR based on the one or more SR modes without actually selecting the SR mode (e.g., based on instructions stored on one or more processors 803, in memory 805, as received from eNB 804, etc.).

Method 900 also includes, at Block 910, transmitting SR to the network entity in at least one uplink TTI of the one or more TTIs configured for uplink communications based at least in part on the at least one SR mode. SR transmitting component 814 can transmit the SR to the network entity (e.g., eNB 804) in at least one uplink TTI of the one or more TTIs configured for uplink communications based at least in part on the at least one SR mode. For example, where SR mode determining component 812 determines the one or more SR modes to use for UE 802 (whether based on an indicator received from SR mode selecting component 822 or otherwise), SR transmitting component 814 transmits the SR according to the one or more SR modes (an example of which is shown in frame structure 750 of FIG. 7). It is to be appreciated that SR transmitting component 814 can additionally determine whether to transmit an SR in the at least one uplink TTI based on determining whether data is present (e.g., in a buffer of UE 802) for transmitting to the eNB 204. Where SR mode selecting component 822 determines the one or more SR modes for the UE 802 and resource grant generating component 820 generates a resource grant for the SRs based on the one or more SR modes, resource grant receiving component 810 can receive the resource grant, and SR transmitting component 814 transmits SRs to eNB 804 based on the resource grant.

As described, for example, where the one or more SR modes includes a periodic SR mode, SR transmitting component 814 can transmit the SR (e.g., via transceiver 806) according to a period, which may be defined by the eNB 804 and configured to the UE 802. In either case, the period can correspond to a period of TTIs during which SR transmission is allowed for the UE 802. This may correspond to a period of all TTIs, a period of the TTIs that are dedicated for uplink communications, etc.

Where the one or more SR modes includes an aperiodic SR mode, SR transmitting component 814 can transmit the SR in certain TTIs configured for uplink communications (e.g., dedicated uplink TTIs, TTIs dynamically configurable to be uplink or downlink that are configured for uplink communications, etc.). The TTIs may be scheduled for the UE 802 by eNB 804 and/or UE 802 may determine the TTIs (e.g., when the UE 802 determines that it has data to transmit to eNB 804). In this example, as the uplink TTI may also be used to transmit other control data, transmitting the SR at Block 910 may include, at Block 912, multiplexing the SR with one or more other transmissions in the uplink TTI. SR transmitting component 814 can generate the SR for transmitting, and communicating component 661 can multiplex the SR with the one or more other transmissions in the uplink TTI (e.g., with an ACK/NACK, CSI, or similar control data transmission).

Where the one or more SR modes includes an opportunistic SR mode, SR transmitting component 814 can transmit SR on configured TTIs, where the configured TTIs are configured for uplink communications. For example, SR transmitting component 814 can transmit the SR according to a period over the dynamic TTIs configurable for uplink or downlink communications. Where a TTI is configured for downlink communications, however, SR transmitting component 814 can mask transmission of the SR in the TTI, which can include refraining from transmitting the SR in the TTI, reserving the SR for transmission in another TTI, transmitting the SR with small or NULL power in the TTI, etc. Thus, in one example, method 900 may optionally include, at Block 914, masking a previous transmission of the SR in one or more TTIs configured as a downlink TTI. As described, SR transmitting component 814 can mask the previous transmission of the SR in the one or more TTIs configured as a downlink TTI (e.g., one or more of the configurable TTIs that is/are configured for downlink communications).

Moreover, in an example, resource grant generating component 820 can configure contention-based resources for the UE 802, which can relate to resources to be granted to the UE 802 based on a random access procedure performed with the eNB 804. In this example, resource grant receiving component 810 can receive the contention-based resource grant from eNB 804 (e.g. as part of the random access procedure) for communicating with the eNB 804 by communicating component 661. In this example, transmitting the SR at Block 910 may optionally include, at Block 916, transmitting the SR along with a contention-based resource buffer status. SR transmitting component 814 can transmit the SR along with communicating component 661 additionally transmitting the contention-based resource buffer status in an attempt to acquire contention-based resources from the eNB 804. Thus, for example, SR transmitting component 814 can still transmit SRs to eNB 804 in an attempt to acquire additional resources for faster communications with eNB 804, and/or to provide a fallback if the contention-based uplink resources are not sufficient to transmit data in the buffer or if transmission thereover is unsuccessful.

It is to be appreciated that if the UE 802 has data to transmit but eNB 804 has not configured SR or contention-based resources for the UE 802, communicating component 661 can perform a random access procedure with the eNB 804 (e.g., on an SCell of the eNB 804, as described further below) to receive resources for transmitting data to the eNB 804. The random access procedure, in this example, may include the preamble transmission along with a contention-based uplink transmission (e.g., an indication of the buffer status) if the UE 802 uplink is not in synchronization with eNB 804, or the contention-based uplink transmission without the preamble transmission if the UE 802 uplink is in synchronization with the eNB 804.

In one example, it is to be appreciated that the SR mode selection and SR transmission described herein can be performed on one of multiple carriers with eNB 804 and/or other eNBs in carrier aggregation (CA) or multiple connectivity. For example, the SR mode selection can be performed for a eCC or other SCell carrier, while the PCell carrier can use the SR scheduling defined for a communication technology based on a TTI having a longer duration (e.g., a 1 ms subframe TTI in LTE). In addition, the SCell carrier, in this regard, may have a shorter TTI than the PCell carrier to provide a faster SR to resource grant turnaround time, which can provide improved latency on the SCell eCC. Thus, method 900 may also optionally include, at Block 918, transmitting another SR to the network entity related to another CC that utilizes another TTI having a longer duration than the TTIs. SR transmitting component 814 can transmit the another SR to the network entity (e.g., eNB 804) related to another CC (e.g., a PCell CC) that utilizes another TTI (e.g., 1 ms subframe TTI) having a longer duration than the TTIs. In this regard, SR transmitting component 814 can transmit an SR for each of multiple CCs according to a different TTI duration for one or more of the multiple CCs, as described herein.

Moreover, it is to be appreciated that SR mode determining component 812 may determine the one or more SR modes for certain logical channels transmitted over the SCell eCC. Thus, for example, selecting the at least one SR mode at Block 904 and transmitting the SR at Block 910 may occur for a certain logical channels that are transmitted over the SCell eCC to achieve a certain desired latency that may not be achievable by the PCell CC (e.g., using LTE). It is to be appreciated that this can be configured at upper layers at the UE 802 (e.g., an RRC layer can configure certain channels on the SCell eCC to achieve a latency, guaranteed bit rate, quality-of-service, etc. associated therewith).

In addition, in an example, SR transmitting component 814 may maintain a SR prohibit timer 816 to prevent repeated transmission of SR within a period of time. For example, where UE 802 is configured for multiple SR modes, SR transmitting component 814 may transmit SR in multiple TTIs based on the multiple SR modes. In this regard, for example, SR transmitting component 814 can initialize the SR prohibit timer 816 when SR is transmitted, and can refrain from transmitting SR again until a SR transmission opportunity occurring after the timer expires, regardless of whether SR transmission is allowed according to one or more of the selected SR modes. The value for initializing the SR prohibit timer 816 can be configured by a network node (e.g., eNB 804 or another node), stored in a configuration of the UE 802, and/or the like.

FIG. 10 illustrates an example method 1000 for indicating (e.g., by an eNB) at least one SR mode to a UE in a wireless network. Method 1000 includes, at Block 1002, communicating with a UE using a frame structure that allows dynamic switching of TTIs between uplink and downlink communications. Scheduling component 602 (FIG. 8) can communicate with the UE (e.g., UE 802) using the frame structure that allows dynamic switching of TTIs between uplink and downlink communications. In one example, resource grant generating component 820 can configure UE 802 with resources designated based on the frame structure, which scheduling component 602 can use to transmit and/or receive communications to/from UE 802. In an example, the frame structure can be similar to frame structure 700, 750 (FIG. 7) including dedicated downlink TTIs, TTIs configurable for either uplink or downlink communications, and dedicated uplink TTIs. Moreover, for example, scheduling component 602 may determine and communicate the frame structure to the UE 802, in one example, which can include indicating dedicated uplink/downlink TTIs, indicating a configuration for other TTIs configurable for uplink or downlink communications, indicating when the configurable TTIs switch from downlink to uplink and/or vice versa, etc.

Method 1000 also optionally includes, at Block 1004, selecting at least one SR mode for SR transmission from the UE in one or more of the TTIs configured for uplink communications based at least in part on the frame structure. SR mode selecting component 822 can select the at least one SR mode for SR transmission from the UE (e.g., UE 802) in one or more of the TTIs configured for uplink communications based at least in part on the frame structure. Additionally, for example, SR mode selecting component 822 can select the at least one SR mode based at least in part on one or more eNB 804 capabilities, UE 802 capabilities, load or capacity at the eNB 804, power class or subscription level of the UE 802, data rate requirements of the UE 802 or its related CCs/bearer(s), and/or the like.

Method 1000 further optionally includes, at Block 1006, transmitting a configuration including an indication of the at least one SR mode to the UE. Scheduling component 602 can transmit the configuration including the indication of the at least one SR mode to the UE (e.g., UE 802). In this example, UE 802 can receive the at least one SR mode (e.g., at communicating component 661), and SR mode determining component 812 can determine the one or more SR modes for transmitting SR. Moreover, as described, it is to be appreciated that resource grant generating component 820 can generate resource grants for transmitting SRs and/or for generally transmitting uplink control information, and scheduling component 602 can transmit the resource grants to UE 802. Resource grant receiving component 810 can accordingly receive the resource grants, and can transmit SRs using the grants and based at least in part on the at least one SR mode configured by eNB 804.

Method 1000 can also include, at Block 1008, receiving an SR from the UE in one or more of the TTIs configured for uplink communications based at least in part on the at least one SR mode. Scheduling component 602 may receive the SR from the UE 802 in the one or more TTIs configured for uplink communications based at least in part on the at least one SR mode (e.g., according to the configuration transmitted to the UE 802 and/or the SR resources granted to the UE 802).

Moreover, receiving the SR at Block 1008 may optionally include, at Block 1010, receiving the SR multiplexed with other control data in the one or more TTIs configured for uplink communications. Scheduling component 602 may receive the SR multiplexed with other control data in the one or more TTIs configured for uplink communications. For example, resource grant generating component 820 can grant resources to UE 802 for transmitted uplink control data (e.g., an ACK/NACK, CSI, etc., as described), and where aperiodic SR is configured at UE 802, for example, SR transmitting component 814 can multiplex SR with the control data, as described. Thus, scheduling component 602 can receive and demultiplex the SR and control data for processing thereof. In addition, as described, receiving the SR at Block 1008 may optionally include, at Block 1012, receiving the SR along with a contention-based resource buffer status. Scheduling component 602 may receive the SR along with the contention-based resource buffer status (e.g., where the buffer status can be received as part of a random access procedure), and resource grant generating component 820 may grant resources to the UE 802 based on the buffer status and additional resources to the UE 802 based on the SR, in one example.

Method 1000 may also optionally include, at Block 1014, receiving another SR from the UE related to another CC that utilizes another TTI having a duration longer than the TTIs. Scheduling component 602 can receive the another SR from the UE 802 related to another CC that utilized another TTI having a duration longer than the TTIs. As described, for example, the other CC can be an LTE CC based on a 1 ms subframe TTI, and the SR can be received according to periodic SR transmission defined in LTE. Scheduling component 602 can accordingly receive SR for the eCC and the LTE CC, and resource grant generating component 820 can generate resource grants to the UE 802 for both the eCC and the LTE CC, as described.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating a scheduling request (SR) in a wireless network, comprising:
establishing, by a user equipment (UE), a plurality of component carriers with one or more network entities for concurrent communication over the plurality of component carriers;
communicating, by the UE, with a network entity of the one or more network entities over a first one of the plurality of component carriers and using a frame structure having one or more configurable transmission time intervals (TTI) that allow dynamic switching from being configured for downlink communications to being configured for uplink communications;
selecting at least one SR mode of multiple SR modes for SR transmission to the network entity in one or more uplink TTIs of the frame structure, wherein the multiple SR modes include a periodic SR mode for periodically transmitting the SR in one or more dedicated uplink TTIs dedicated for uplink communications in the frame structure and an opportunistic SR mode for transmitting the SR in at least one of the one or more configurable TTIs that are configured for uplink communications in the frame structure, wherein a previous transmission for the SR in one or more downlink TTIs configured for downlink communication in the frame structure is masked in the opportunistic SR mode;

transmitting, by the UE, a SR to the network entity in at least one uplink TTI of the one or more uplink TTIs based at least in part on the at least one SR mode, wherein the SR corresponds to the first one of the plurality of component carriers established with the network entity; and transmitting, by the UE, another SR corresponding to a second one of the plurality of component carriers that utilizes another TTI that is of a longer duration than the TTIs.

2. The method of claim 1, wherein the TTIs correspond to one or more orthogonal frequency division multiplexing symbols.

3. The method of claim 1, further comprising receiving a configuration from the network entity specifying one or more SR modes, wherein selecting the at least one SR mode comprises selecting the at least one SR mode from the one or more SR modes based on the configuration.

4. The method of claim 1, wherein the multiple SR modes include an aperiodic SR mode for multiplexing the SR with one or more other transmissions in the one or more uplink TTIs.

5. The method of claim 4, wherein the one or more other transmissions includes at least one of a hybrid automatic repeat/request (HARQ) transmission or a channel state information (CSI) transmission in the at least one uplink TTI.

6. The method of claim 1, wherein transmitting the SR is based at least in part on a SR prohibit timer enabled to prevent repeated transmission of the SR within a period of time.

7. The method of claim 1, further comprising transmitting contention-based resource buffer status with the SR in the at least one uplink TTI.

8. The method of claim 1, wherein transmitting the SR for the first one of the plurality of component carriers is based at least in part on one or more latency parameters for data to be transmitted over the first one of the plurality of component carriers.

9. The method of claim 1, wherein establishing the plurality of component carriers with the one or more network entities is based on carrier aggregation with the network entity or multiple connectivity with the network entity and at least one additional network entity.

10. A user equipment for communicating a scheduling request (SR) in a wireless network, comprising:
 a transceiver;
 at least one processor communicatively coupled with the transceiver via a bus for communicating signals in the wireless network; and
 a memory communicatively coupled with the at least one processor and/or the transceiver via the bus;
 wherein the at least one processor and the memory are operable to:

establish a plurality of component carriers with one or more network entities for concurrent communication over the plurality of component carriers;
 communicate, via the transceiver, with a network entity of the one or more network entities over a first one of the plurality of component carriers and using a frame structure having one or more configurable transmission time intervals (TTI) that allow dynamic switching from being configured for downlink communications to being configured for uplink communications;
 select at least one SR mode of multiple SR modes for SR transmission to the network entity in one or more uplink TTIs of the frame structure, wherein the multiple SR modes include a periodic SR mode for periodically transmitting the SR in one or more dedicated uplink TTIs dedicated for uplink communications in the frame structure and an opportunistic SR mode for transmitting the SR in at least one of the one or more configurable TTIs that are configured for uplink communications in the frame structure, wherein a previous transmission for the SR in one or more downlink TTIs configured for downlink communication in the frame structure is masked in the opportunistic SR mode;
 transmit, via the transceiver, a SR to the network entity in at least one uplink TTI of the one or more uplink TTIs based at least in part on the at least one SR mode, wherein the SR corresponds to the first one of the plurality of component carriers established with the network entity; and
 transmit, via the transceiver another SR corresponding to a second one of the plurality of component carriers that utilizes another TTI that is of a longer duration than the TTIs.

11. The user equipment of claim 10, wherein the TTIs correspond to one or more orthogonal frequency division multiplexing symbols.

12. The user equipment of claim 10, wherein the at least one processor and the memory are further operable to receive a configuration from the network entity specifying one or more SR modes, and select the at least one SR mode from the one or more SR modes based on the configuration.

13. The user equipment of claim 10, wherein the multiple SR modes include an aperiodic SR mode for multiplexing the SR with one or more other transmissions in the one or more uplink TTIs.

14. The user equipment of claim 13, wherein the one or more other transmissions includes at least one of a hybrid automatic repeat/request (HARQ) transmission or a channel state information (CSI) transmission in the at least one uplink TTI.

15. The user equipment of claim 10, wherein the at least one processor and the memory are operable to transmit the SR based at least in part on a SR prohibit timer enabled to prevent repeated transmission of the SR within a period of time.

16. The user equipment of claim 10, wherein the at least one processor and the memory are operable to transmit contention-based resource buffer status with the SR in the at least one uplink TTI.

17. The user equipment of claim 10, wherein the at least one processor and the memory are operable to transmit the SR for the first one of the plurality of component carriers based at least in part on one or more latency parameters for data to be transmitted over the first one of the plurality of component carriers.

18. The user equipment of claim 10, wherein the at least one processor and the memory are further operable to establish the plurality of component carriers with the one or more network entities based on carrier aggregation with the network entity or multiple connectivity with the network entity and at least one additional network entity.

19. A user equipment for communicating a scheduling request (SR) in a wireless network, comprising:
means for establishing a plurality of component carriers with one or more network entities for concurrent communication over the plurality of component carriers;
means for communicating with a network entity of the one or more network entities over a first one of the plurality of component carriers and using a frame structure having one or more configurable transmission time intervals (TTI) that allow dynamic switching from being configured for downlink communications to being configured for uplink communications;
means for selecting at least one SR mode of the multiple SR modes for SR transmission to the network entity in one or more uplink TTIs of the frame structure, wherein the multiple SR modes include a periodic SR mode for periodically transmitting the SR in one or more dedicated uplink TTIs dedicated for uplink communications in the frame structure and an opportunistic SR mode for transmitting the SR in at least one of the one or more configurable TTIs that are configured for uplink communications in the frame structure, wherein a previous transmission for the SR in one or more downlink TTIs configured for downlink communication in the frame structure is masked in the opportunistic SR mode;
means for transmitting a SR to the network entity in at least one uplink TTI of the one or more uplink TTIs based at least in part on the at least one SR mode, wherein the SR corresponds to the first one of the plurality of component carriers established with the network entity; and
means for transmitting another SR corresponding to a second one of the plurality of component carriers that utilizes another TTI that is of a longer duration than the TTIs.

20. The user equipment of claim 19, wherein the TTIs correspond to one or more orthogonal frequency division multiplexing symbols.

21. The user equipment of claim 19, further comprising means for receiving a configuration from the network entity specifying one or more SR modes, wherein the means for selecting the at least one SR mode selects the at least one SR mode from the one or more SR modes based on the configuration.

22. The user equipment of claim 19, wherein the multiple SR modes include an aperiodic SR mode for multiplexing the SR with one or more other transmissions in the one or more uplink TTIs.

23. The user equipment of claim 22, wherein the one or more other transmissions includes at least one of a hybrid automatic repeat/request (HARQ) transmission or a channel state information (CSI) transmission in the at least one uplink TTI.

24. The user equipment of claim 19, wherein the means for transmitting the SR transmits the SR based at least in part on a SR prohibit timer enabled to prevent repeated transmission of the SR within a period of time.

25. A non-transitory computer-readable storage medium comprising computer-executable code for communicating a scheduling request (SR) in a wireless network, the code comprising:
code for establishing, by a user equipment (UE), a plurality of component carriers with one or more network entities for concurrent communication over the plurality of component carriers;
code for communicating, by the UE, with a network entity of the one or more network entities over a first one of the plurality of component carriers and using a frame structure having one or more configurable transmission time intervals (TTI) that allow dynamic switching from being configured for downlink communications to being configured for uplink communications;
code for selecting at least one SR mode of the multiple SR modes for SR transmission to the network entity in one or more uplink TTIs of the frame structure, wherein the multiple SR modes include a periodic SR mode for periodically transmitting the SR in one or more dedicated uplink TTIs dedicated for uplink communications in the frame structure and an opportunistic SR mode for transmitting the SR in at least one of the one or more configurable TTIs that are configured for uplink communications in the frame structure, wherein a previous transmission for the SR in one or more downlink TTIs configured for downlink communication in the frame structure is masked in the opportunistic SR mode;
code for transmitting, by the UE, a SR to the network entity in at least one uplink TTI of the one or more uplink TTIs based at least in part on the at least one SR mode, wherein the SR corresponds to the first one of the plurality of component carriers established with the network entity; and
code for transmitting, by the UE, another SR corresponding to a second one of the plurality of component carriers that utilizes another TTI that is of a longer duration than the TTIs.

26. The non-transitory computer-readable storage medium of claim 25, wherein the TTIs correspond to one or more orthogonal frequency division multiplexing symbols.

27. The non-transitory computer-readable storage medium of claim 25, further comprising code for receiving a configuration from the network entity specifying one or more SR modes, wherein the code for selecting the at least one SR mode selects the at least one SR mode from the one or more SR modes based on the configuration.

28. The non-transitory computer-readable storage medium of claim 25, wherein the multiple SR modes include an aperiodic SR mode for multiplexing the SR with one or more other transmissions in the one or more uplink TTIs.

29. The non-transitory computer-readable storage medium of claim 28, wherein the one or more other transmissions includes at least one of a hybrid automatic repeat/request (HARQ) transmission or a channel state information (CSI) transmission in the at least one uplink TTI.

30. The non-transitory computer-readable storage medium of claim 25, wherein the code for transmitting the SR transmits the SR based at least in part on a SR prohibit timer enabled to prevent repeated transmission of the SR within a period of time.

* * * * *